(12) United States Patent
Oishi

(10) Patent No.: US 10,298,833 B2
(45) Date of Patent: May 21, 2019

(54) IMAGE CAPTURING APPARATUS AND FOCUSING METHOD THEREOF

(71) Applicant: HAMAMATSU PHOTONICS K.K., Hamamatsu-shi, Shizuoka (JP)

(72) Inventor: Hideshi Oishi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 555 days.

(21) Appl. No.: 14/397,976

(22) PCT Filed: Jan. 17, 2013

(86) PCT No.: PCT/JP2013/050856
§ 371 (c)(1),
(2) Date: Oct. 30, 2014

(87) PCT Pub. No.: WO2014/112085
PCT Pub. Date: Jul. 24, 2014

(65) Prior Publication Data
US 2015/0156396 A1   Jun. 4, 2015

(30) Foreign Application Priority Data

Dec. 19, 2011   (JP) .................................. 2011-277533

(51) Int. Cl.
*H04N 5/232*   (2006.01)
*G02B 21/24*   (2006.01)
(Continued)

(52) U.S. Cl.
CPC ......... *H04N 5/23212* (2013.01); *G02B 7/343* (2013.01); *G02B 21/18* (2013.01);
(Continued)

(58) Field of Classification Search
CPC ............................ H04N 5/23212; G02B 21/18
See application file for complete search history.

(56) References Cited

U.S. PATENT DOCUMENTS

| 5,668,887 A | 9/1997 | Parker et al. |
| 6,181,474 B1 | 1/2001 | Ouderkirk et al. |

(Continued)

FOREIGN PATENT DOCUMENTS

| CN | 30179961 | 8/2010 |
| CN | 101963582 | 2/2011 |

(Continued)

OTHER PUBLICATIONS

English-language translation of International Preliminary Report on Patentability (IPRP) dated Jul. 30, 2015 that issued in WO Patent Application No. PCT/JP2013/050852.

(Continued)

*Primary Examiner* — Anner N Holder
*Assistant Examiner* — Hesham K Abouzahra
(74) *Attorney, Agent, or Firm* — Drinker Biddle & Reath LLP

(57) ABSTRACT

In the image capturing apparatus, the optical path difference producing member is disposed on the second optical path. Thereby, the amount of light for imaging an optical image which is focused at the front of an optical image made incident into the first imaging device (front focus) and an optical image which is focused at the rear thereof (rear focus) by the second imaging device can be suppressed to secure the amount of light on image pickup by the first imaging device. Further, in the image capturing apparatus, at least one of a position of the first imaging region and a position of the second imaging region on the imaging area is changed, thus making it possible to easily adjust an interval between the front focus and the rear focus. It is, thereby, possible to detect a focus position of the sample at high accuracy.

12 Claims, 17 Drawing Sheets

(51) Int. Cl.
 *G02B 21/18* (2006.01)
 *G02B 7/34* (2006.01)
 *G02B 21/36* (2006.01)
 *H04N 5/225* (2006.01)
(52) U.S. Cl.
 CPC ......... *G02B 21/241* (2013.01); *G02B 21/367* (2013.01); *H04N 5/2258* (2013.01)

(56) References Cited

U.S. PATENT DOCUMENTS

| | | | |
|---|---|---|---|
| 8,780,418 | B1 | 7/2014 | Bluzer et al. |
| 9,041,930 | B1 | 5/2015 | Young et al. |
| 2001/0012069 | A1 | 8/2001 | Derndinger et al. |
| 2002/0186304 | A1 | 12/2002 | Kono et al. |
| 2003/0168577 | A1 | 9/2003 | Zhang |
| 2005/0258335 | A1* | 11/2005 | Oshiro ................ G02B 21/244 250/201.3 |
| 2007/0206097 | A1 | 9/2007 | Uchiyama et al. |
| 2010/0053612 | A1 | 3/2010 | Ou-Yang et al. |
| 2011/0157350 | A1* | 6/2011 | Yamamoto ............ G02B 21/14 348/79 |
| 2011/0317259 | A1 | 12/2011 | Tanabe et al. |
| 2012/0075455 | A1* | 3/2012 | Hiraide ................ G02B 21/247 348/79 |
| 2013/0141561 | A1 | 6/2013 | Kishima |
| 2013/0155499 | A1 | 6/2013 | Dixon |
| 2013/0170029 | A1 | 7/2013 | Morita et al. |
| 2015/0130920 | A1 | 5/2015 | Zou et al. |

FOREIGN PATENT DOCUMENTS

| | | |
|---|---|---|
| CN | 102057269 | 5/2011 |
| CN | 102298206 | 12/2011 |
| CN | 102313980 | 1/2012 |
| CN | 102419473 | 4/2012 |
| CN | 102628799 | 8/2012 |
| CN | 102859418 | 1/2013 |
| CN | 102882107 | 1/2013 |
| CN | 104755989 A | 7/2015 |
| EP | 2 916 159 | 9/2015 |
| EP | 2 916 160 | 9/2015 |
| JP | H08-320430 A | 12/1996 |
| JP | 2002-365524 | 12/2002 |
| JP | 2003-185914 | 7/2003 |
| JP | 2005-202092 | 7/2005 |
| JP | 2008-020498 | 1/2008 |
| JP | 2009-086429 | 4/2009 |
| JP | 2011-081211 A | 4/2011 |
| JP | 2012-194487 | 10/2012 |
| JP | 2013-127578 A | 6/2013 |
| JP | 2013-127579 A | 6/2013 |
| JP | 2013-127580 A | 6/2013 |
| JP | 2013-127581 A | 6/2013 |
| WO | WO-2005/114287 A1 | 12/2005 |
| WO | WO-2005/114293 A1 | 12/2005 |
| WO | WO-2013/165576 A1 | 11/2013 |

OTHER PUBLICATIONS

English-language translation of International Preliminary Report on Patentability (IPRP) dated Jul. 30, 2015 that issued in WO Patent Application No. PCT/JP2013/050857.
English-language translation of International Preliminary Report on Patentability (IPRP) dated Jul. 30, 2015 that issued in WO Patent Application No. PCT/JP2013/050853.
English-language translation of International Preliminary Report on Patentability (IPRP) dated Jul. 30, 2015 that issued in WO Patent Application No. PCT/JP2013/050856.
U.S. Office Action dated Oct. 7, 2016 that issues in U.S. Appl. No. 14/397,996 including Double Patenting Rejections on pp. 2-8.
U.S. Office Action dated Oct. 7, 2016 that issued in U.S. Appl. No. 14/398,029 including Double Patenting Rejections on pp. 2-3.
Office Action dated Jan. 26, 2017 in U.S. Appl. No. 14/398,011.
NanoZoomer-XR, "Redefining the Art of Whole-Slide Imagining," Hamamatsu Photonics K.K. Product Catalog, 2012 (4 pages).

* cited by examiner

*Fig.5*
(a)
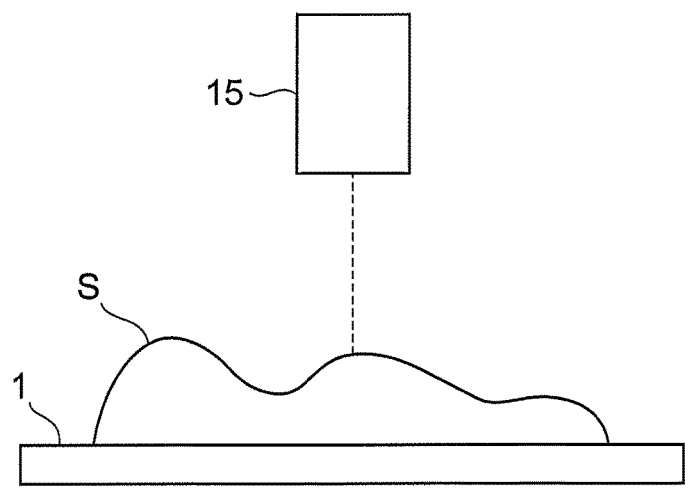
(b)
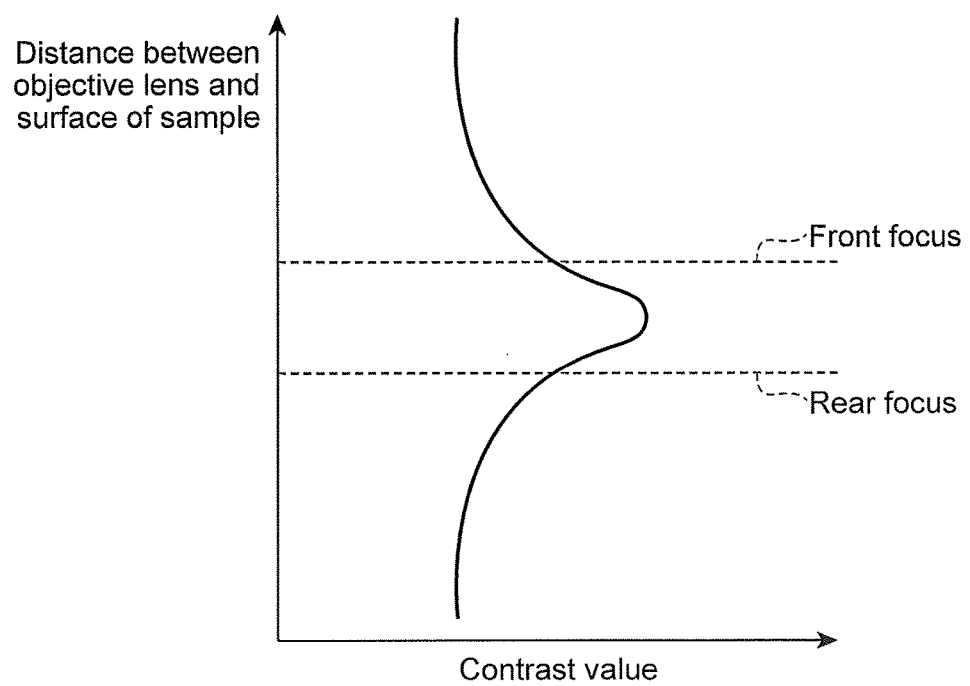

Fig.6
(a)
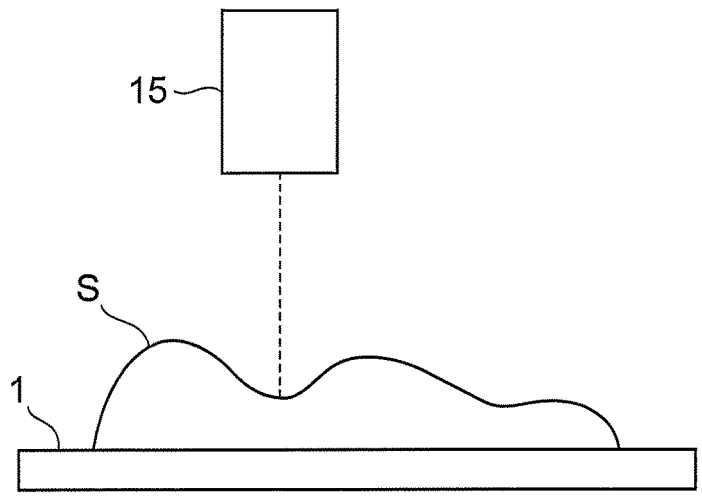
(b)
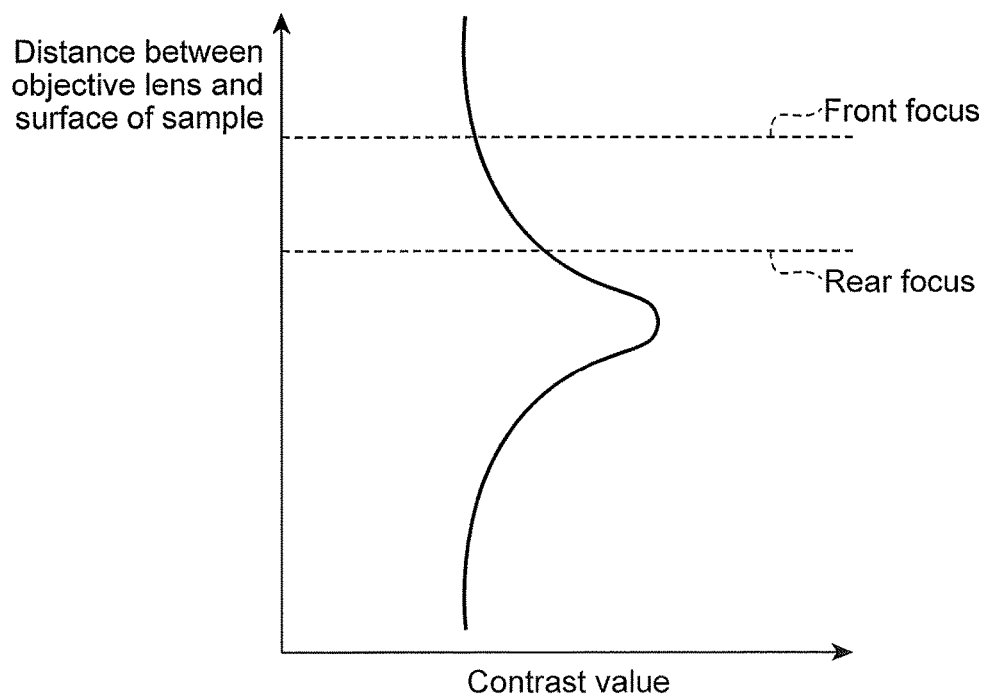

*Fig.7*
(a)
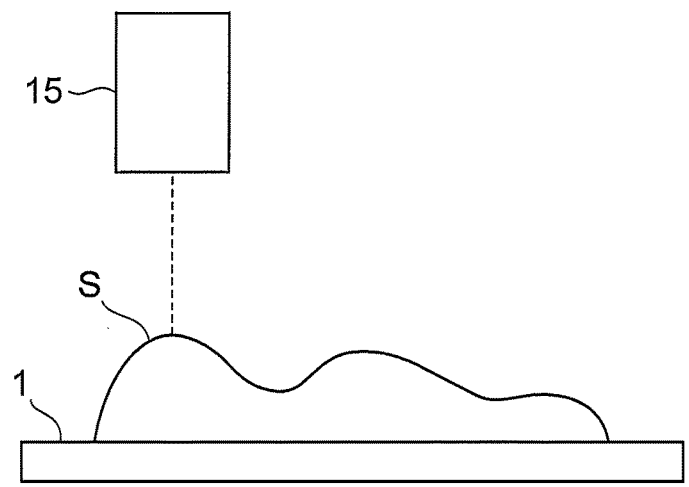
(b)
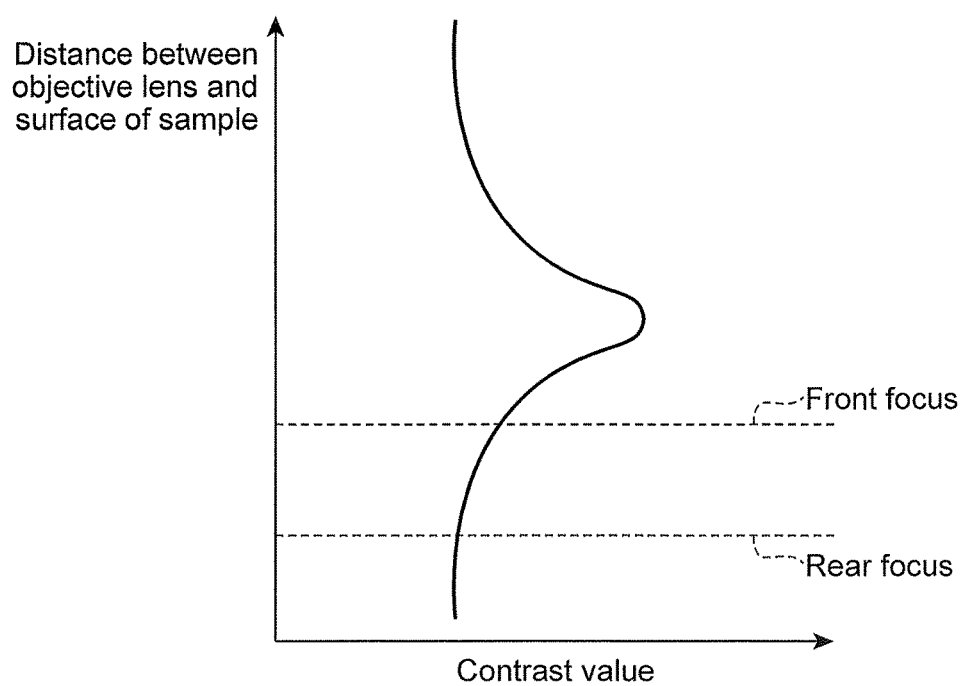

Fig.12
(a)
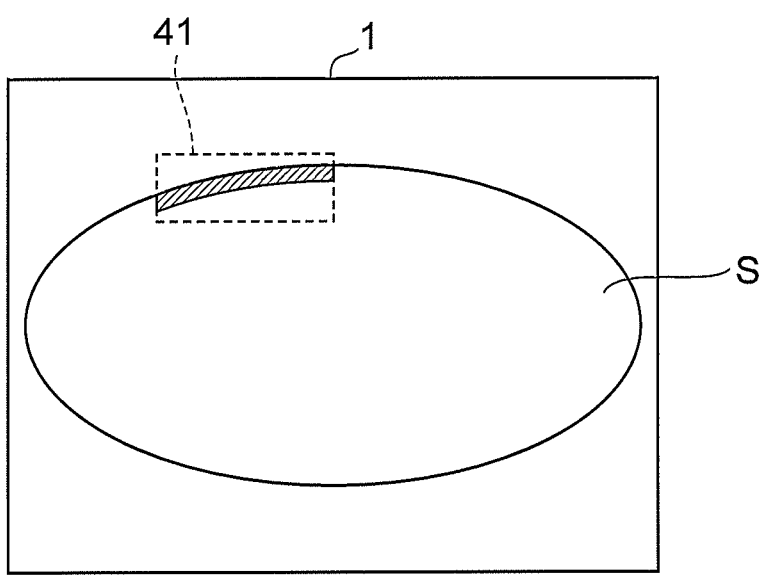
(b)
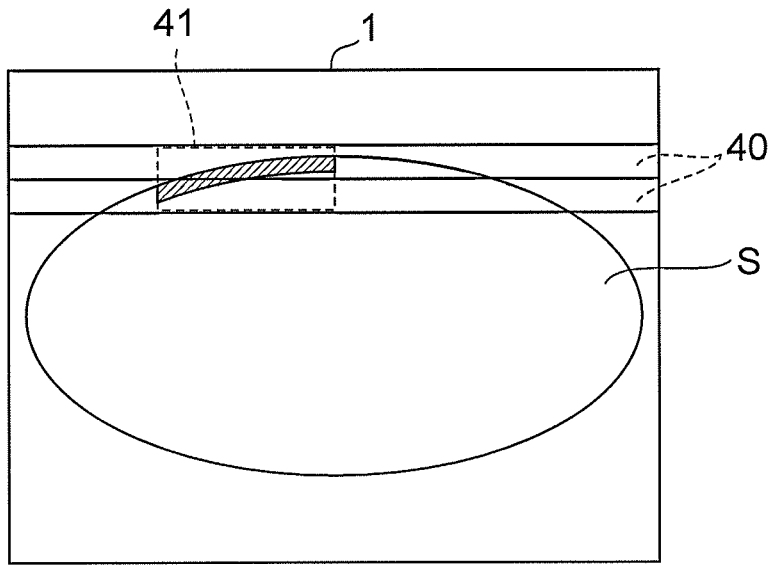

IMAGE CAPTURING APPARATUS AND FOCUSING METHOD THEREOF

TECHNICAL FIELD

The present invention relates to an image capturing apparatus which is used for capturing images of a sample, etc., and also relates to a focusing method thereof.

BACKGROUND ART

Image capturing apparatuses include a virtual microscope apparatus in which, for example, an imaging region of a sample is in advance divided into a plurality of regions to image the divided regions at a high magnification and, thereafter, to synthesize the regions. In capturing images by using the virtual microscope as described above, conventionally, as conditions for picking up images of a sample such as a biological sample, a focus map which covers an entire region of the sample is set to capture images of the sample, while focus control is performed based on the focus map.

In preparation of the focus map, at first, an image capturing apparatus equipped with a macro optical system is used to capture an entire sample as a macro image. Next, the thus captured macro image is used to set an image pickup range of the sample and also the range is divided into a plurality of regions to set a focus obtaining position for each of the divided regions. After the focus obtaining position has been set, the sample is transferred to the image capturing apparatus equipped with a micro optical system to capture a focus position at the thus set focus obtaining position, thereby preparing a focus map with reference to the focus position.

However, in preparation of the above-described focus maps, there has been a problem that processing needs time. Further, suppression of intervals and the number of focuses to be obtained would reduce the time necessary for the processing. In this case, however, there has been a problem of reduction in focus accuracy. Therefore, development of dynamic focus for capturing images of a sample at a high magnification, with a focus position being obtained, is now underway. The dynamic focus is a method in which a present direction of the focus position deviating from the height of an objective lens is detected based on a difference in light intensity or a difference in contrast between an optical image which is focused at the front of an optical image made incident into an imaging device for capturing an image (front focus) and an optical image which is focused at the rear thereof (rear focus), thereby allowing the objective lens to move in a direction at which the deviation is cancelled to capture an image.

A microscope system disclosed, for example, in Patent Document 1, is provided with a second imaging unit which images a region at the front of a region imaged by a first imaging unit, an automatic focusing control unit which adjusts a focusing position of an objective lens at an imaging position of the first imaging unit based on an image picked up by the second imaging unit, and a timing control unit which synchronizes timing at which a divided region moves from an imaging position of the second imaging unit to the imaging position of the first imaging unit with timing at which an image forming position of the divided region imaged by the second imaging unit is positioned at an imaging area of the first imaging unit depending on a distance between the divided regions and a speed at which a sample moves. Further, in a microscope apparatus disclosed, for example, in Patent Document 2 or Patent Document 3, a glass member is used to make a difference in optical path length inside a light guiding optical system for focus control.

CITATION LIST

Patent Literature

[Patent Document 1] Japanese Patent Application Laid-Open No. 2011-081211
[Patent Document 2] Japanese Patent Publication No. WO2005/114287
[Patent Document 3] Japanese Patent Publication No. WO2005/114293

SUMMARY OF INVENTION

Technical Problem

In the microscope system described in Patent Document 1, a half mirror and a mirror are used to form an optical path difference optical system, by which light different in optical path length is made incident into each of two imaging regions of the second imaging unit. In the conventional microscope system, for example, a line sensor is used to constitute a first imaging unit and a second imaging unit. In the line sensor, it is important to secure an amount of light for capturing a clear image due to short exposure time. However, in the conventional microscope system, light is divided by the optical path difference optical system. Thus, there is posed such a problem that it is difficult to secure an amount of light.

Further, where a plural number of contrast peaks are present in an image picked up by the second imaging device or where a peak is flat in shape, it is necessary to optimize a difference in optical path length (an interval between the front focus and the rear focus) in order to detect a deviation direction of the focus position in relation to the height of the objective lens. However, the above-described conventional microscope system is required to change positions of the half mirror and the mirror or a position of the second imaging unit in adjusting an optical path difference, for which a complicated step is needed.

The present invention has been made for solving the above problem, an object of which is to provide an image capturing apparatus which is capable of easily adjusting an optical path difference of an optical path difference optical system to detect a focus position of a sample at high accuracy and also to provide a focusing method thereof.

Solution to Problem

In order to solve the above-described problem, the image capturing apparatus of the present invention is characterized by having a light source which radiates light to a sample, a light guiding optical system including a light dividing unit which divides an optical image of the sample into a first optical path for capturing an image and a second optical path for focus control, a first imaging unit which captures a first image by a first optical image divided into the first optical path, a second imaging unit which captures a second image by a second optical image divided into the second optical path, and a focus control unit which analyzes the second image to control a focus position of image pickup by the first imaging unit based on the analysis result, in which the second imaging unit is provided an imaging area on which a first imaging region and a second imaging region for capturing a partial image of the second optical image are set, an optical path difference producing member which gives a continuous optical path difference to the second optical image along an in-plane direction of the imaging area is disposed on the second optical path, and there is also provided a region control unit which controls at least one of a position of the first imaging region and a position of the second imaging region on the imaging area along the in-plane direction.

In the image capturing apparatus, the optical path difference producing member is disposed on the second optical path. Thereby, at the first imaging region and the second imaging region on the second imaging unit, it is possible to image respectively an optical image which is focused at the front of an optical image made incident into the first imaging unit (front focus) and an optical image which is focused at the rear thereof (rear focus). In the image capturing apparatus, it is possible to make a difference in optical path length without dividing light on the second optical path for focus control. Therefore, an amount of light at the second optical path necessary for obtaining information on a focus position can be suppressed to secure an amount of light on image pickup by the first imaging unit. Further, in the image capturing apparatus, at least one of the position of the first imaging region and the position of the second imaging region on the imaging area is controlled by the region control unit, thus making it possible to easily adjust an interval between the front focus and the rear focus. It is, thereby, possible to detect a focus position of the sample at high accuracy.

Further, it is preferable that the optical path difference producing member is a glass member having a part which changes in thickness along the in-plane direction of the imaging area. In this case, it is possible to make an optical path difference of the second optical image by a simple configuration.

It is also preferable that the region control unit changes one of the position of the first imaging region and the position of the second imaging region along the in-plane direction in such a manner that an interval between the first imaging region and the second imaging region will change. In this case, it is possible to change widely the interval between the first imaging region and the second imaging region. On the other hand, only one of the first imaging region and the second imaging region is changed, thus making it possible to shorten the time necessary for the change.

It is also preferable that the region control unit changes both the position of the first imaging region and the position of the second imaging region along the in-plane direction so that an interval between the first imaging region and the second imaging region will change. In this case, it is possible to change widely the interval between the first imaging region and the second imaging region.

It is also preferable that the region control unit changes both the position of the first imaging region and the position of the second imaging region along the in-plane direction, with an interval between the first imaging region and the second imaging region being kept. In this case, it is possible to shorten the time necessary for the change in interval between the first imaging region and the second imaging region.

It is still also preferable that there are provided an objective lens which faces to a sample and an objective lens control unit which controls a position of the objective lens relatively with respect to the sample based on control by the focus control unit, and the objective lens control unit will not actuate the objective lens during analysis of the focus position which is being performed by the focus control unit and will allow the objective lens to move with respect to the sample in one direction during analysis of the focus position which is not being performed by the focus control unit. In this case, since no change in positional relationship will take place between the objective lens and the sample during analysis of the focus position, it is possible to secure analysis accuracy of the focus position.

Further, the focusing method of the image capturing apparatus in the present invention is a focusing method of an image capturing apparatus which is characterized by having a light source which radiates light to a sample, a light guiding optical system including a light dividing unit which divides an optical image of the sample into a first optical path for capturing an image and a second optical path for focus control, a first imaging unit which captures a first image by a first optical image divided into the first optical path, a second imaging unit which captures a second image by a second optical image divided into the second optical path, and a focus control unit which analyzes the second image to control a focus position of image pickup by the first imaging unit based on the analysis result, in which an imaging area having a first imaging region and a second imaging region for capturing a partial image of the second optical image is installed at the second imaging unit, an optical path difference producing member which gives an optical path difference to the second optical image along an in-plane direction of the imaging area is disposed on the second optical path, and a region control unit is used to control at least one of a position of the first imaging region and a position of the second imaging region on the imaging area along the in-plane direction.

In the above-described focusing method, the optical path difference producing member is disposed on the second optical path. Thereby, at the first imaging region and the second imaging region of the second imaging unit, it is possible to image respectively an optical image which is focused at the front of an optical image made incident into the first imaging unit (front focus) and an optical image which is focused at the rear thereof (rear focus). In the focusing method, it is possible to make a difference in optical path length without dividing light on the second optical path for focus control. Therefore, an amount of light at the second optical path necessary for obtaining information on a focus position can be suppressed to secure an amount of light on image pickup by the first imaging unit. Further, in the focusing method, at least one of the position of the first imaging region and the position of the second imaging region on the imaging area is controlled by the region control unit, thus making it possible to easily adjust an interval between the front focus and the rear focus. It is, thereby, possible to detect a focus position of the sample at high accuracy.

Further, it is preferable that, as the optical path difference producing member, there is used a glass member having a part which changes in thickness along the in-plane direction of the imaging area. In this case, it is possible to make an optical path difference of the second optical image by a simple constitution.

It is also preferable that the region control unit is used to change one of the position of the first imaging region and the position of the second imaging region along the in-plane direction in such a manner that an interval between the first imaging region and the second imaging region will change. In this case, it is possible to change widely the interval between the first imaging region and the second imaging region. On the other hand, only one of the first imaging region and the second imaging region is changed, thus making it possible to shorten the time necessary for the change.

It is also preferable that the region control unit is used to change both the position of the first imaging region and the position of the second imaging region along the in-plane direction in such a manner that an interval between the first imaging region and the second imaging region will change. In this case, it is possible to change widely the interval between the first imaging region and the second imaging region.

It is also preferable that the region control unit is used to change both the position of the first imaging region and the position of the second imaging region along the in-plane direction, with an interval between the first imaging region and the second imaging region being kept. In this case, it is possible to shorten the time necessary for the change in interval between the first imaging region and the second imaging region.

It is also preferable that the image capturing apparatus is provided with an objective lens which faces to a sample and an objective lens control unit which controls a position of the objective lens relatively with respect to the sample based on control by the focus control unit, in which the objective lens control unit will not actuate the objective lens during analysis of the focus position which is being performed by the focus control unit and will allow the objective lens to move with respect to the sample in one direction during analysis of the focus position which is not being performed by the focus control unit. In this case, since no change in positional relationship will take place between the objective lens and the sample during analysis of the focus position, it is possible to secure analysis accuracy of the focus position.

Advantageous Effects of Invention

The present invention is able to easily adjust an optical path difference of the optical path difference optical system and also to detect a focus position of the sample at high accuracy.

BRIEF DESCRIPTION OF DRAWINGS

FIG. 5 is a drawing which shows an analysis result of a contrast value where a distance to the surface of a sample is in agreement with the focal length of an objective lens.

FIG. 6 is a drawing which shows an analysis result of a contrast value where a distance to the surface of the sample is longer than the focal length of the objective lens.

FIG. 7 is a drawing which shows an analysis result of a contrast value where a distance to the surface of the sample is shorter than the focal length of the objective lens.

FIG. 12 is a drawing which shows a state that a scanning region of the stage is reset.

DESCRIPTION OF EMBODIMENTS

Hereinafter, a description will be given in detail of preferred embodiments of the image capturing apparatus and the focusing method of the image capturing apparatus in the present invention with reference to drawings.

Figure 1:
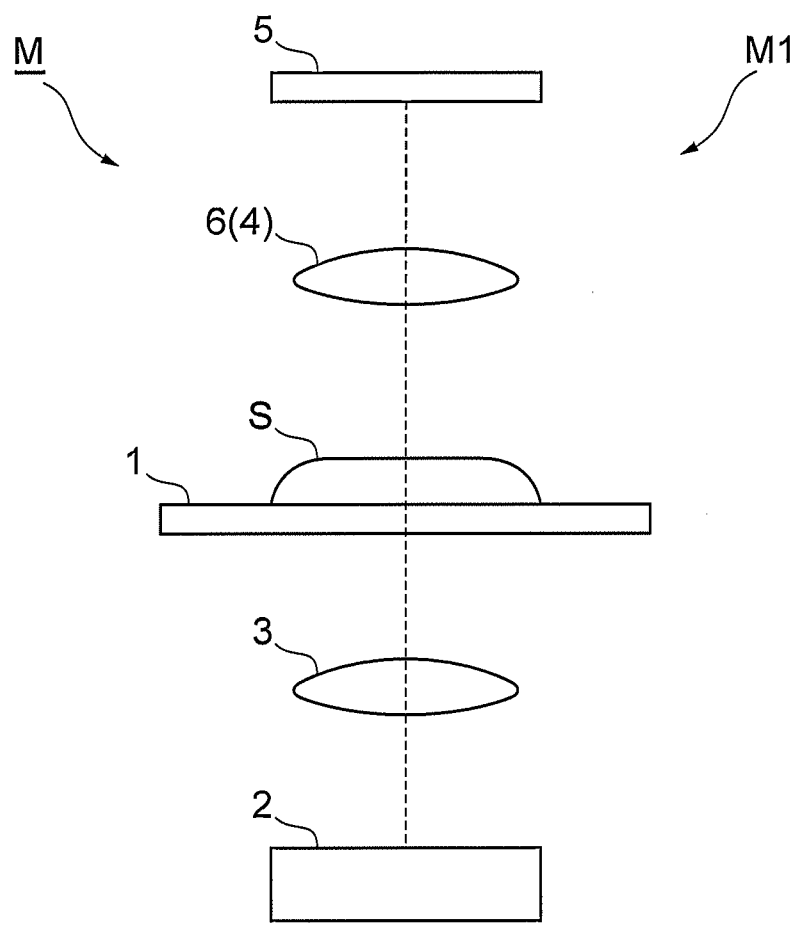
FIG. 1 is a drawing which shows one embodiment of a macro image capturing device which constitutes an image capturing apparatus of the present invention.
Figure 2:
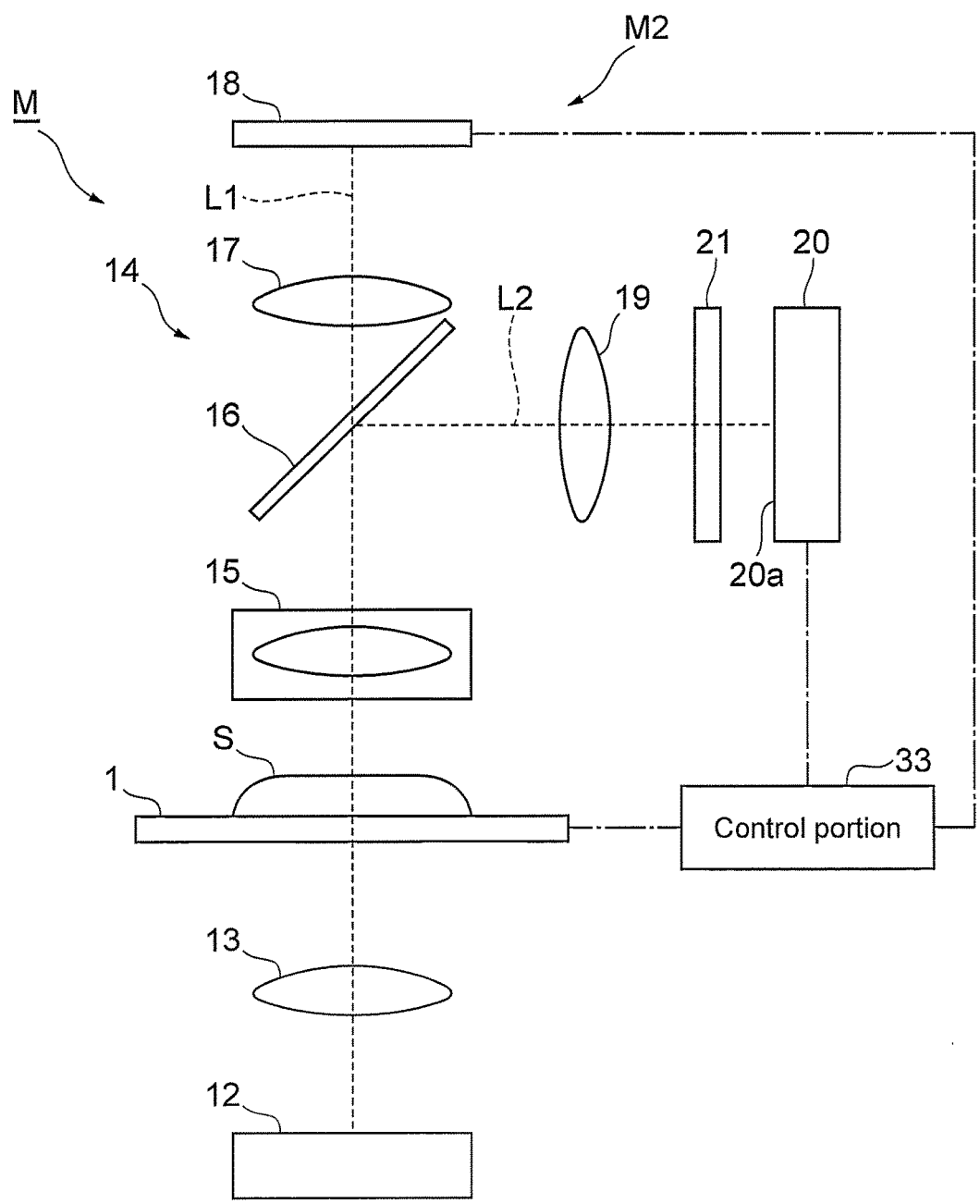
FIG. 2 is a drawing which shows one embodiment of a micro image capturing device which constitutes the image capturing apparatus of the present invention.
Figure 9:
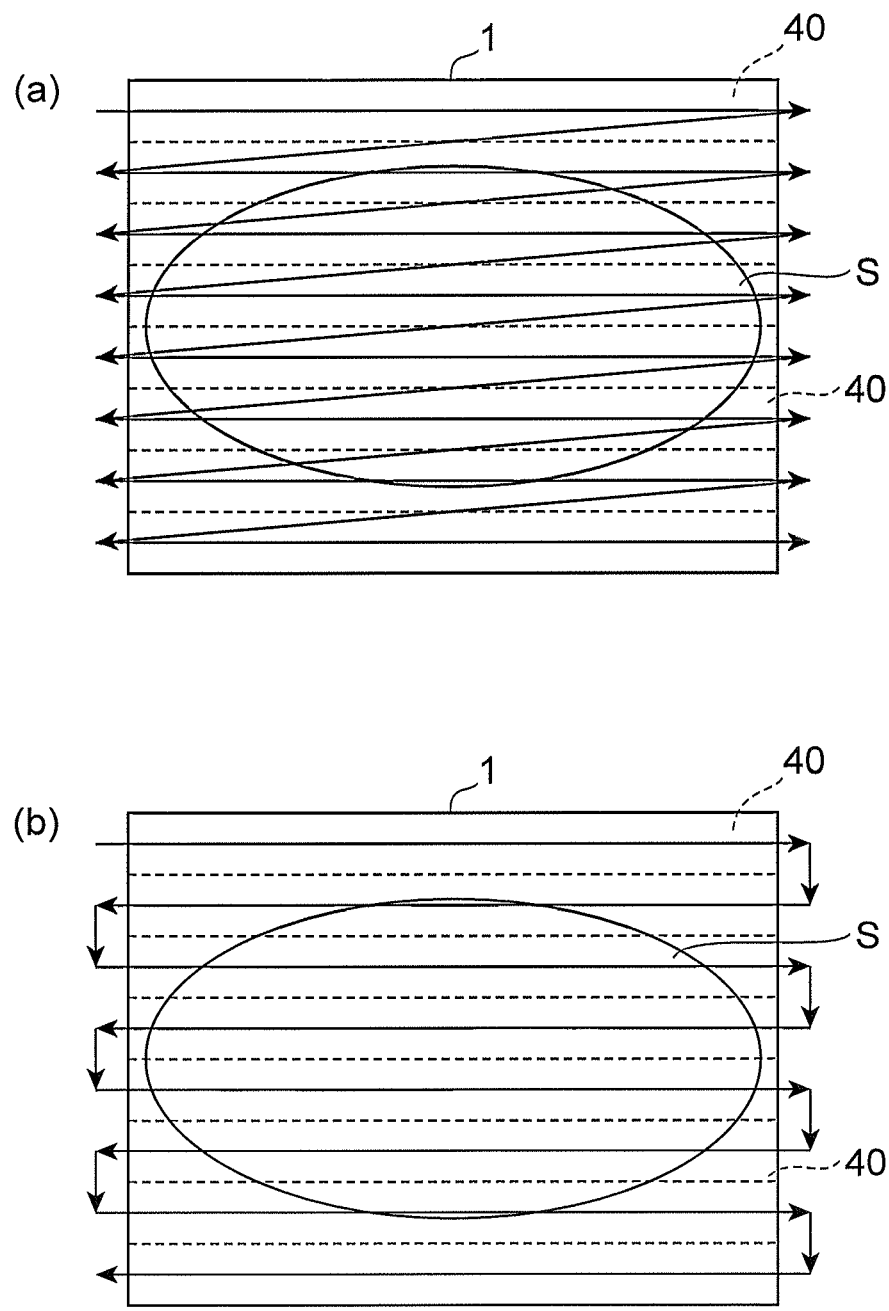
FIG. 9 is a drawing which shows control of a scanning direction of the stage by a stage control portion.

FIG. 1 is a drawing which shows one embodiment of the macro image capturing device which constitutes the image capturing apparatus of the present invention. FIG. 2 is a drawing which shows one embodiment of the micro image capturing device which constitutes the image capturing apparatus of the present invention. As shown in FIG. 1 and FIG. 2, an image capturing apparatus M is constituted with a macro image capturing device M1 for capturing a macro image of a sample S and a micro image capturing device M2 for capturing a micro image of the sample S. The image capturing apparatus M is an apparatus which sets, for example, a plurality of line-shaped divided regions 40 with respect to the macro image captured by the macro image capturing device M1 (refer to FIG. 9) and produces a virtual micro image by capturing and synthesizing each of the divided regions 40 by the micro image capturing device M2 at a high magnification.

As shown in FIG. 1, the macro image capturing device M1 is provided with a stage 1 which supports the sample S. The stage 1 is an XY stage which is actuated in a horizontal direction by a motor or an actuator such as a stepping motor (pulse motor) or a piezo actuator, for example. The sample S which is observed by using the image capturing apparatus M is, for example, a biological sample such as cells and placed on the stage 1 in a state of being sealed on a slide glass. The stage 1 is actuated inside the XY plane, by which an imaging position with respect to the sample S is allowed to move. Moreover, the stage 1 is able to move back and forth between the macro image capturing device M1 and the micro image capturing device M2 and provided with functions to deliver the sample S between the devices. It is acceptable that when a macro image is captured, an entire image of the sample S is picked up at one time or the sample S is divided into a plurality of regions to pick up each of the images. It is also acceptable that the stage 1 is installed both on the macro image capturing device M1 and on the micro image capturing device M2.

A light source 2 which radiates light to the sample S and a condensing lens 3 which concentrates light from the light source 2 at the sample S are disposed on a bottom of the stage 1. It is acceptable that the light source 2 is disposed so as to radiate light obliquely to the sample S. Further, a light guiding optical system 14 which guides an optical image from the sample S and an imaging device 5 which images the optical image of the sample S are disposed on an upper face of the stage 1. The light guiding optical system 14 is provided with an image forming lens 6 which forms the optical image from the sample S at an imaging area of the imaging device 5. Still further, the imaging device 5 is an area sensor which is capable of capturing, for example, a two-dimensional image. The imaging device 5 captures an entire image of the optical image of the sample S made incident into the imaging area via the light guiding optical system 14 and is housed at a virtual micro image housing portion 39 to be described later.

As shown in FIG. 2, the micro image capturing device M2 is provided on the bottom of the stage 1 with a light source 12 and a condensing lens 13, as with the macro image capturing device M1. Further, a light guiding optical system 14 which guides an optical image from the sample S is disposed on the upper face of the stage 1. The optical system which radiates light from the light source 12 to the samples may include an excitation light radiating optical system which radiates excitation light to the sample S and a dark-field illuminating optical system which captures a dark-field image of the sample S.

The light guiding optical system 14 is provided with an objective lens 15 disposed so as to face to the sample S and a beam splitter (light dividing unit) 16 disposed at a rear stage of the objective lens 15. The objective lens 15 is provided with a motor and an actuator such as a stepping motor (pulse motor) and a piezo actuator for actuating the objective lens 15 in a Z direction orthogonal to a face on which the stage 1 is placed. A position of the objective lens 15 in the Z direction is changed by these actuation units, thus making it possible to adjust a focus position of image pickup when an image of the sample S is captured. It is acceptable that the focus position is adjusted by changing a position of the stage 1 in the Z direction or by changing positions of both the objective lens 15 and the stage 1 in the Z direction.

The beam splitter 16 is a portion which divides an optical image of the sample S into a first optical path L1 for capturing an image and a second optical path L2 for focus control. The beam splitter 16 is disposed at an angle of approximately 45 degrees with respect to an optical axis from the light source 12. In FIG. 2, an optical path passing through the beam splitter 16 is given as the first optical path L1, while an optical path reflected at the beam splitter 16 is given as the second optical path.

On the first optical path L1, there are disposed an image forming lens 17 which forms the optical image of the sample S (first optical image) which has passed through the beam splitter 16 and a first imaging device (first imaging unit) 18 in which an imaging area is disposed at an image forming position of the image forming lens 17. The first imaging device 18 is a device which is capable of capturing a one-dimensional image (first image) by the first optical image of the sample S, including, for example, a two-dimension CCD sensor and a line sensor capable of realizing TDI (time delay integration) actuation. Further, in a method which captures images of the sample S sequentially, with the stage 1 controlled at a constant speed, the first imaging device 18 may be a device which is capable of capturing a two-dimensional image such as a CMOS sensor and a CCD sensor. First images picked up by the first imaging device 18 are sequentially stored in a temporary storage memory such as a lane buffer, thereafter, compressed and output at an image producing portion 38 to be described later.

On the other hand, on the second optical path L2, there are disposed a view-field adjusting lens 19 which contracts an optical image of a sample reflected by the beam splitter 16 (second optical image) and a second imaging device (second imaging unit) 20. Further, at a front stage of the second imaging device 20, there is disposed an optical path difference producing member 21 which gives a continuous optical path difference to the second optical image. It is preferable that the view-field adjusting lens 19 is constituted in such a manner that the second optical image is formed at the second imaging device 20 in a dimension similar to that of the first optical image.

The second imaging device 20 is a device which is capable of capturing a two-dimensional image (second image) by the second optical image of the sample S, including, for example, sensors such as a CMOS (complementary metal oxide semiconductor) and a CCD (charge coupled device). It is also acceptable that a line sensor is used.

Figure 3:
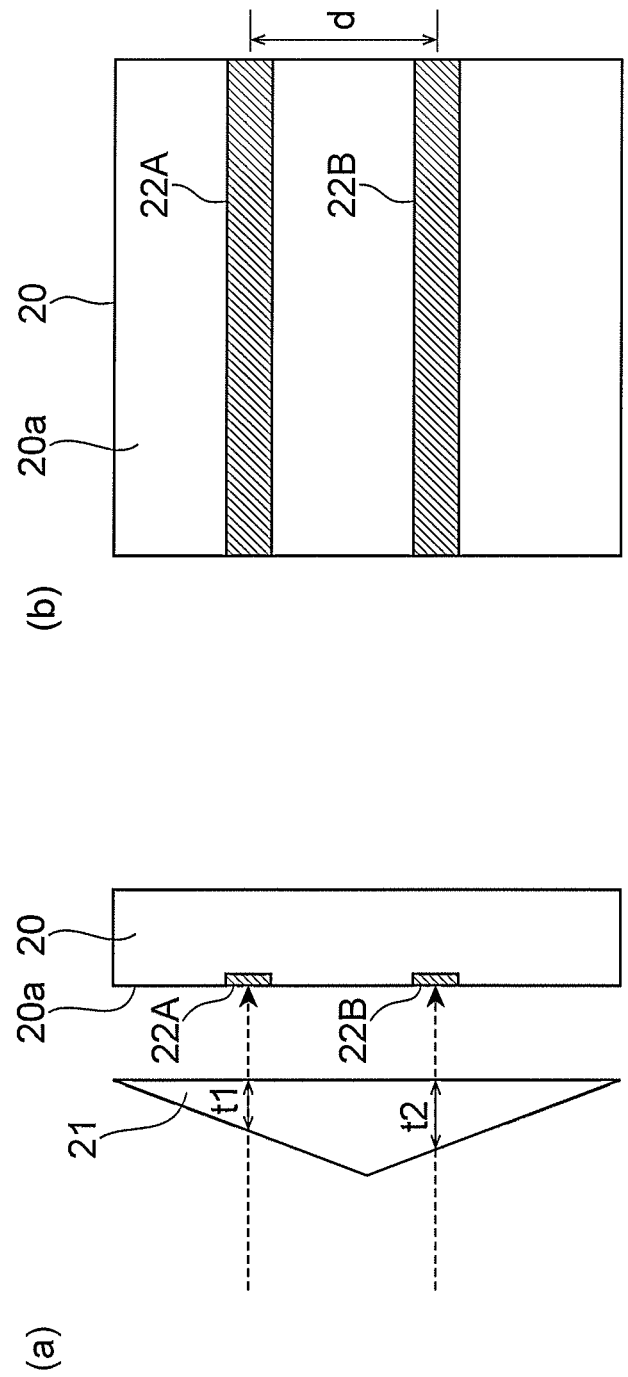
FIG. 3 is a drawing which shows an optical path difference producing member and a second imaging device.

An imaging area 20a of the second imaging device 20 is disposed so as to be substantially in alignment with an XZ plane orthogonal to the second optical path L2. As shown in FIG. 3, a first imaging region 22A and a second imaging region 22B which capture a partial image of the second optical image are set on the imaging area 20a. The first imaging region 22A and the second imaging region 22B are set in a direction perpendicular to a direction (scanning direction: Z direction) at which the second optical image moves on the imaging area 20a in association with scanning of the sample S. The first imaging region 22A and the second imaging region 22B are set, with a predetermined interval kept, and both of them capture a part of the second optical image in a line shape. Thereby, an optical image at the same region as that of the first optical image of the sample S captured by the first imaging device 18 can be captured as the second optical image at the first imaging region 22A and the second imaging region 22B. It is acceptable that each of the first imaging region 22A and the second imaging region 22B is set by using a separate line sensor. In this case, each of the line sensors is controlled separately, thus making it possible to shorten the time necessary for setting the first imaging region 22A and the second imaging region 22B.

The optical path difference producing member 21 is a glass member having a part which changes in thickness along the in-plane direction of the imaging area 20a of the second imaging device 20. In an example shown in FIG. 3, the optical path difference producing member 21 is formed so as to have a triangular prism-shaped cross section and disposed in such a manner that an apex thereof is substantially in alignment with a central part of the imaging area 20a in the Z direction. Therefore, the second optical image made incident into the imaging area 20a is the longest in optical path at the central part of the imaging area 20a in the Z direction and becomes shorter in optical path moving towards both ends of the imaging area 20a in the Z direction. Further, it is preferable that the optical path difference producing member 21 is disposed in such a manner that a face which faces to the second imaging device 20 is in parallel with the imaging area (light receiving face) 20a of the second imaging device. Thereby, it is possible to reduce deflection of light by the face which faces to the second imaging device 20 and to secure an amount of light received by the second imaging device 20.

Accordingly, the second imaging device 20 is able to capture an optical image which is focused at the front of a first optical image made incident into the first imaging device 18 (front focus) and an optical image which is focused at the rear thereof (rear focus) based on a position of the first imaging region 22A and that of the second imaging region 22B. In the present embodiment, the position of the first imaging region 22A and that of the second imaging region 22B are set in such a manner that, for example, the first imaging region 22A is given as the front focus and the second imaging region 22B is given as the rear focus. A focus difference between the front focus and the rear focus is dependent on a difference between a thickness t1 and an index of refraction of the optical path difference producing member 21 through which the second optical image made incident into the first imaging region 22A passes and a thickness t2 and an index of refraction of the optical path difference producing member 21 through which the second optical image made incident into the second imaging region 22B passes.

Figure 4:
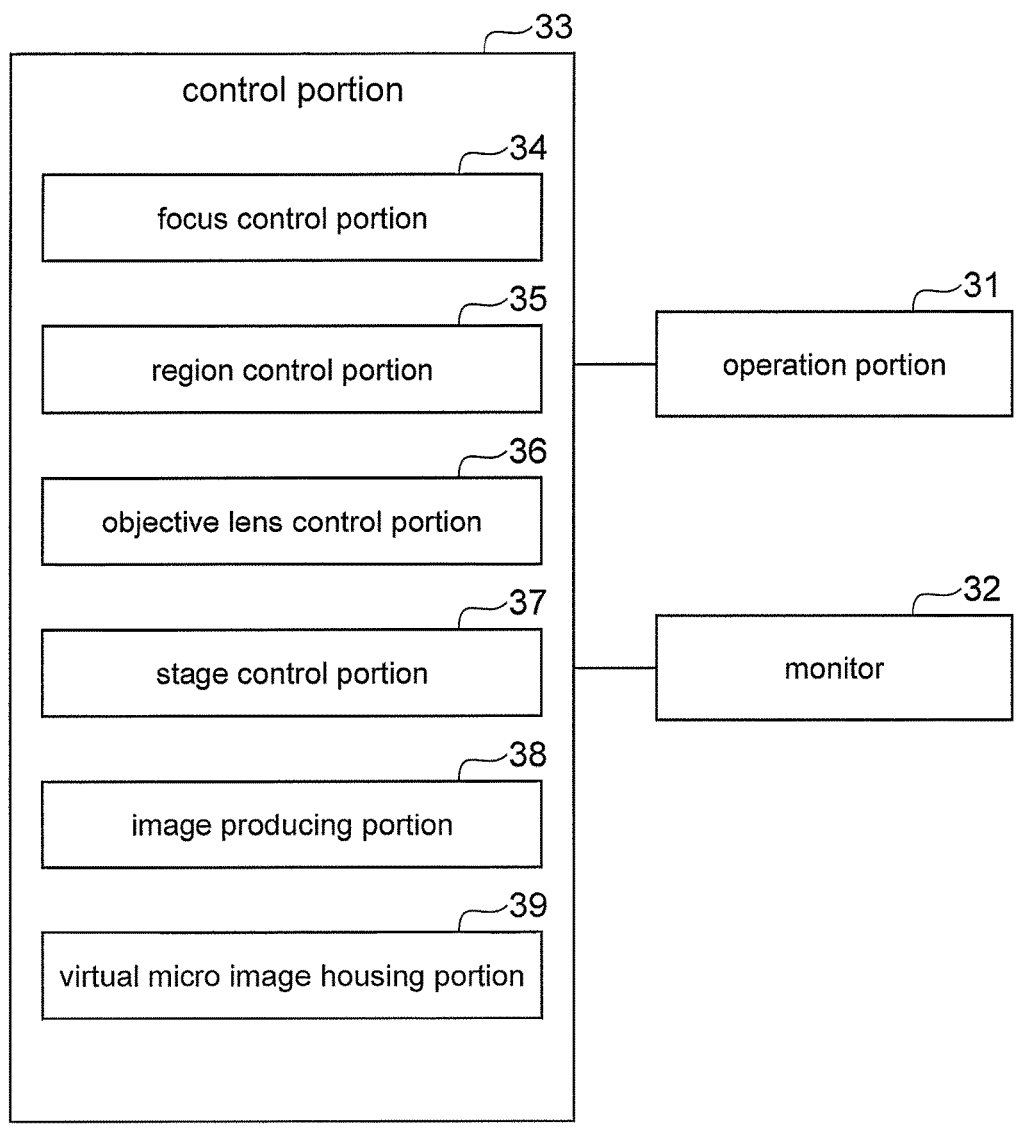
FIG. 4 is a block diagram which shows functional components of the image capturing apparatus.

FIG. 4 is a block diagram which shows functional components of the image capturing apparatus. As shown in the diagram, the image capturing apparatus M is provided with a computer system having housing portions such as a CPU, a memory, a communication interface and a hard disk, an operation portion 31 such as a keyboard, a monitor 32 etc. The functional components of the control portion 33 include a focus control portion 34, a region control portion 35, an objective lens control portion 36, a stage control portion 37, an image producing portion 38 and a virtual micro image housing portion 39.

The focus control portion 34 is a portion which analyzes a second image captured by the second imaging device 20 to control a focus position of an image picked up by the first imaging device 18 based on the analysis result. More specifically, the focus control portion 34 first determines a difference between a contrast value of the image captured at the first imaging region 22A and a contrast value captured at the second imaging region 22B in the second imaging device 20.

Here, as shown in FIG. 5, where a focus position of the objective lens 15 is in alignment with the surface of the sample S, an image contrast value of the front focus captured at the first imaging region 22A is substantially in agreement with an image contrast value of the rear focus captured at the second imaging region 22B. Thereby, a difference value between them is almost zero.

On the other hand, as shown in FIG. 6, where a distance to the surface of the sample S is longer than a focal length of the objective lens 15, an image contrast value of the rear focus captured at the second imaging region 22B is greater than an image contrast value of the front focus captured at the first imaging region 22A. Therefore, a difference value between them is a positive value. In this case, the focus control portion 34 outputs instruction information to the objective lens control portion 36 so as to be actuated in a direction at which the objective lens 15 is brought closer to the sample S.

Further, as shown in FIG. 7, where a distance to the surface of the samples is shorter than a focal length of the objective lens 15, an image contrast value of the rear focus captured at the second imaging region 22B is smaller than an image contrast value of the front focus captured at the first imaging region 22A. Therefore, a difference value between them is a negative value. In this case, the focus control portion 34 outputs instruction information to the objective lens control portion 36 so as to be actuated in a direction at which the objective lens 15 is brought away from the sample S.

The region control portion 35 is a portion which controls a position of the first imaging region 22A and a position of the second imaging region 22B at the imaging area 20a of the second imaging device 20. The region control portion 35 sets at first the first imaging region 22A at a predetermined position based on operation from the operation portion 31 and releases the setting of the first imaging region 22A after image pickup at the first imaging region 22A. Then, the region control portion 35 sets the second imaging region 22B, with a predetermined interval kept in the Z direction from the first imaging region 22A (scanning direction), and releases the setting of the second imaging region 22B after image pickup at the second imaging region 22B.

At this time, waiting time W from image pickup at the first imaging region 22A to image pickup at the second imaging region 22B is set based on an interval d between the first imaging region 22A and the second imaging region 22B and a scanning velocity v of the stage 1. For example, where the waiting time W is given as time W1 from the start of image pickup at the first imaging region 22A to the start of image pickup at the second imaging region 22B, it is possible to determine the waiting time with reference to a formula of $W1=d/v-e1-st$, with consideration given to exposure time e1 of image pickup at the first imaging region 22A and time st from release of the setting of the first imaging region 22A to the setting of the second imaging region 22B.

Further, where the waiting time W is given as waiting time W2 from the start of image pickup at the first imaging region 22A to completion of image pickup at the second imaging region 22B, it is possible to determine the waiting time with reference to a formula of $W2=d/v-st$, with consideration given to time st from release of the setting of the first imaging region 22A to setting of the second imaging region 22B. Still further, an interval d between the first imaging region 22A and the second imaging region 22B is set based on a difference in optical path length made by the optical path difference producing member 21. However, the interval d actually corresponds to a distance of the sample S on a slide. Eventually, it is necessary to convert the interval d to the number of pixels at the second imaging region 22B. Where a pixel size of the second imaging device 20 is expressed in terms of AFpsz and magnification is expressed in terms of AFmag, the number of pixels dpix corresponding to the interval d can be determined with reference to a formula of $dpix=d\div(AFpsz/AFmag)$.

Further, the region control portion 35 is able to change at least one of a position of the first imaging region 22A and that of the second imaging region 22B along an in-plane scanning direction of the imaging area 20a (here, the Z direction) based on operation from the operation portion 31. In this case, it is acceptable to change only one of the position of the first imaging region 22A and that of the second imaging region 22B or both of the position of the first imaging region 22A and that of the second imaging region 22B. It is also acceptable to change both of the position of the first imaging region 22A and that of the second imaging region 22B, with the interval d between the first imaging region 22A and the second imaging region 22B being kept. Where each of the first imaging region 22A and the second imaging region 22B is set by using a separate line sensor, the region control portion 35 changes a position of each of the line sensors.

The position of the first imaging region 22A and the position of the second imaging region 22B are changed.

Thereby, it is possible to change a thickness t1 of the optical path difference producing member 21 through which the second optical image made incident into the first imaging region 22A passes and a thickness t2 of the optical path difference producing member 21 through which the second optical image made incident into the second imaging region 22B passes. Accordingly, an interval between the front focus and the rear focus as shown in FIG. 5 to FIG. 7 is changed, thus making it possible to adjust resolution on determination of a difference in contrast value.

The objective lens control portion 36 is a portion which controls actuation of the objective lens 15. Upon receiving instruction information output from the focus control portion 34, the objective lens control portion 36 actuates the objective lens 15 in the Z direction in accordance with contents of the instruction information. It is, thereby, possible to adjust a focus position of the objective lens 15 with respect to the sample S.

Figure 8:
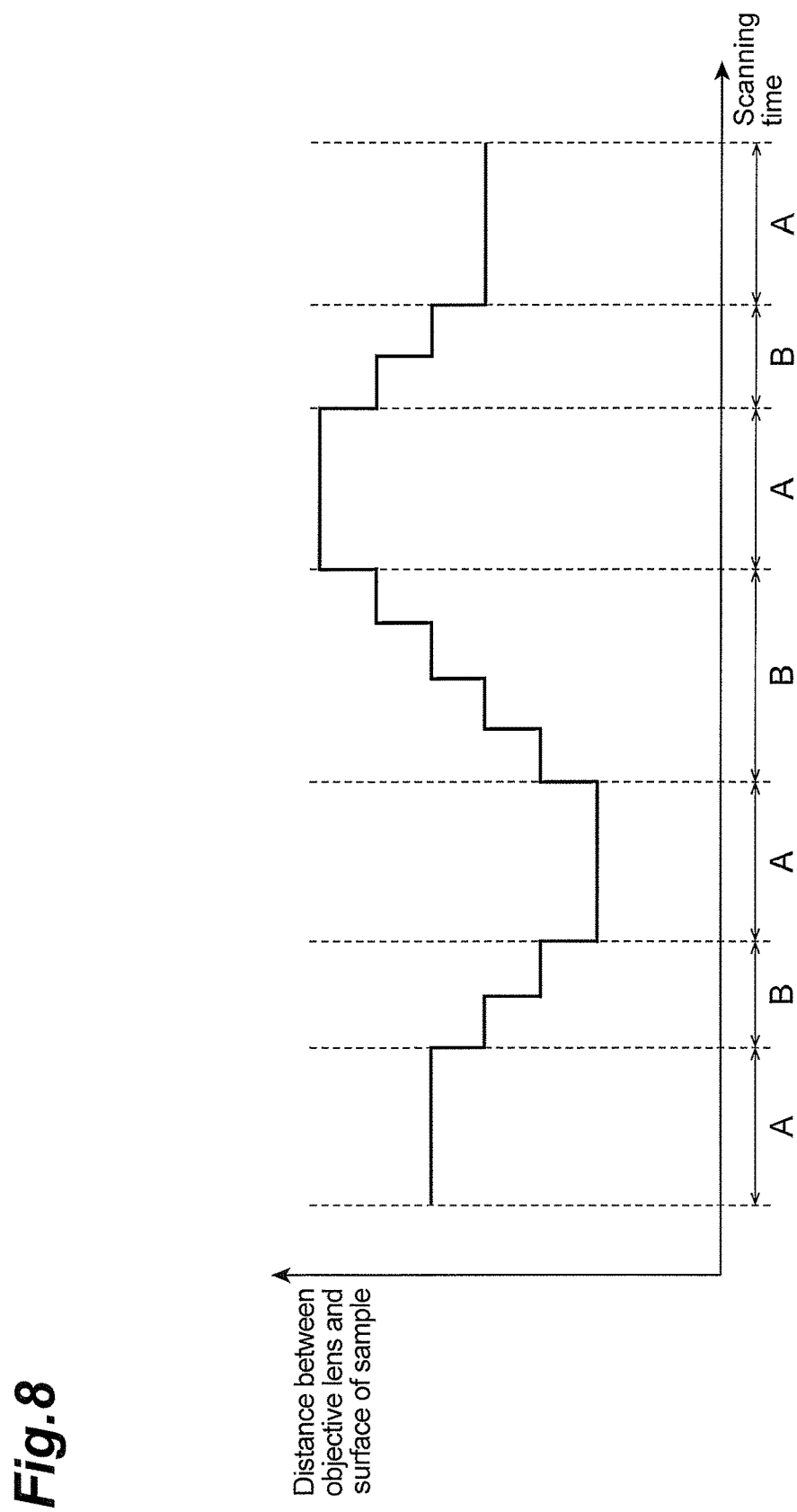
FIG. 8 is a drawing which shows a relationship of the distance between the objective lens and the surface of the sample with respect to scanning time of a stage.

The objective lens control portion 36 will not actuate the objective lens 15 during analysis of the focus position which is being performed by the focus control portion 34 and will actuate the objective lens 15 only in one direction along the Z direction until start of analysis of a next focus position. FIG. 8 is a drawing which shows a relationship of the distance between the objective lens and the surface of the sample with respect to scanning time of the stage. As shown in the drawing, during scanning of the sample S, there will take place alternately an analysis period A of the focus position and an objective lens actuation period B based on an analysis result thereof.

The stage control portion 37 is a portion which controls actuation of the stage 1. More specifically, the stage control portion 37 allows the stage 1 on which the sample S is placed to scan at a predetermined speed based on operation from the operation portion 31. By the scanning of the stage 1, an imaging field of the sample S moves relatively and sequentially at the first imaging device 18 and the second imaging device 20. It is acceptable that, as shown in FIG. 9(a), a scanning direction of the stage 1 is one-directional scanning in which upon every completion of scanning of one divided region 40, a position of the stage 1 is returned to a start position of scanning and then a next divided region 40 is subjected to scanning in the same direction. It is also acceptable that as shown in FIG. 9(b), the scanning direction is bi-directional scanning in which after completion of scanning of one divided region 40, the stage 1 is allowed to move in a direction orthogonal to the scanning direction and a next divided region 40 is subjected to scanning in an opposite direction.

Figure 10:
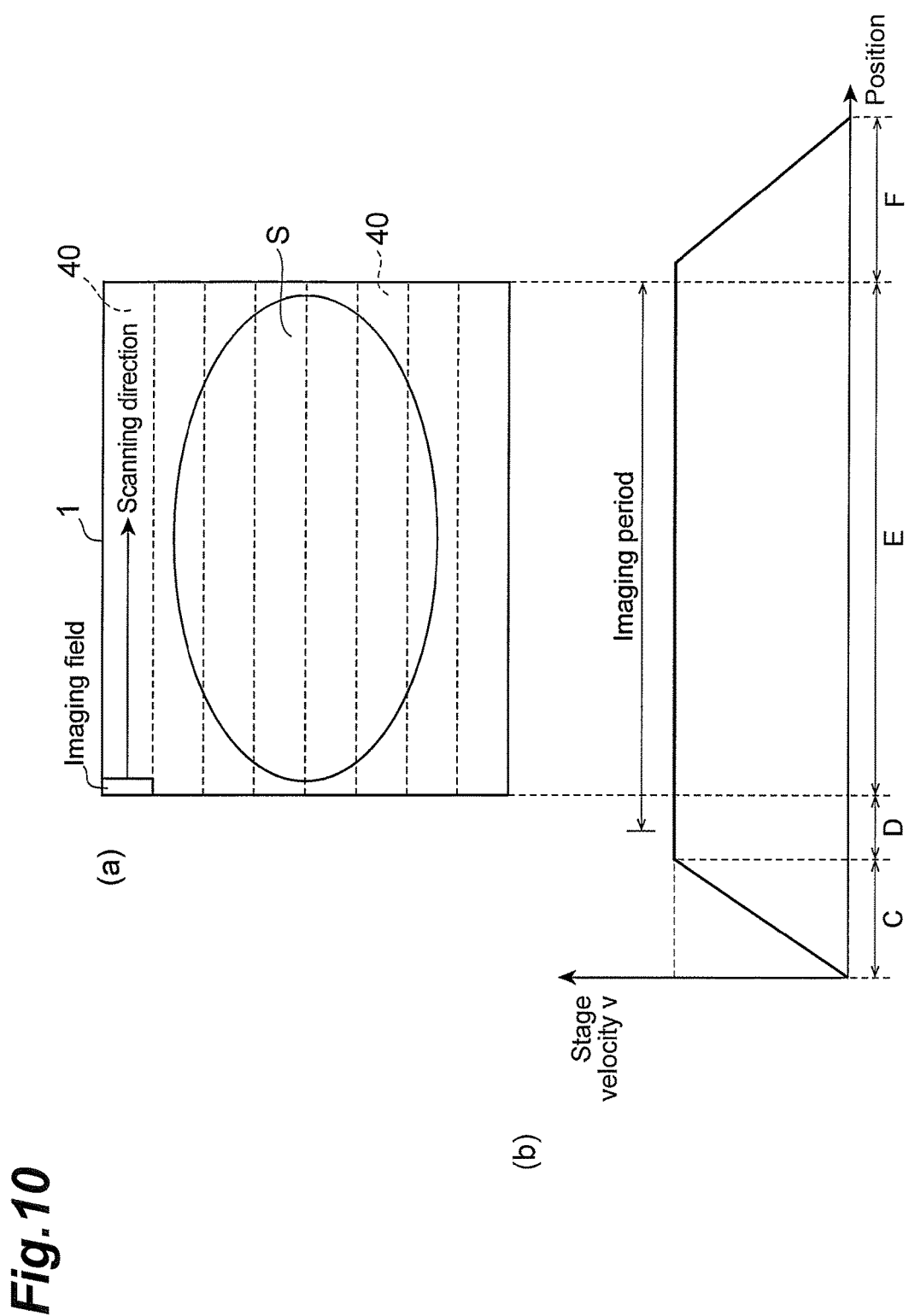
FIG. 10 is a drawing which shows control of a scanning speed of the stage by the stage control portion.

Although the stage 1 is scanned at a constant speed while images are captured, actually, immediately after the start of scanning, there is a period during which the scanning speed is unstable due to influences of vibrations of the stage 1 etc. Thus, as shown in FIG. 10, it is preferable that there is set a scanning width longer than the divided region 40 and an acceleration period C for accelerating the stage 1, a stabilization period D for stabilizing a scanning speed of the stage 1 and a slowing-down period F for slowing down the stage 1 are allowed to take place individually when scanning is performed outside the divided region 40. It is, thereby, possible to capture an image in synchronization with a constant speed period E during which the stage 1 is scanned at a constant speed. It is acceptable that image pickup is started during the stabilization period D and a data part obtained during the stabilization period D is deleted after the image has been captured. The above-described method is desirable when used for an imaging device which requires void reading of data.

The image producing portion 38 is a portion at which a captured image is synthesized to produce a virtual micro image. The image producing portion 38 receives sequentially first images output from the first imaging device 18, that is, images of individual divided regions 40, synthesizing these images to produce an entire image of the sample S. Then, based on the thus synthesized image, prepared is an image, the resolution of which is lower than that of the synthesized image, and housed in a virtual micro image housing portion 39 by associating a high resolution image with a low resolution image. It is acceptable that an image captured by the macro image capturing device M1 is also associated at the virtual micro image housing portion 39. It is also acceptable that the virtual micro image is housed as one image or plurally divided images.

Next, a description will be given of motions of the above-described image capturing apparatus M.

Figure 11:
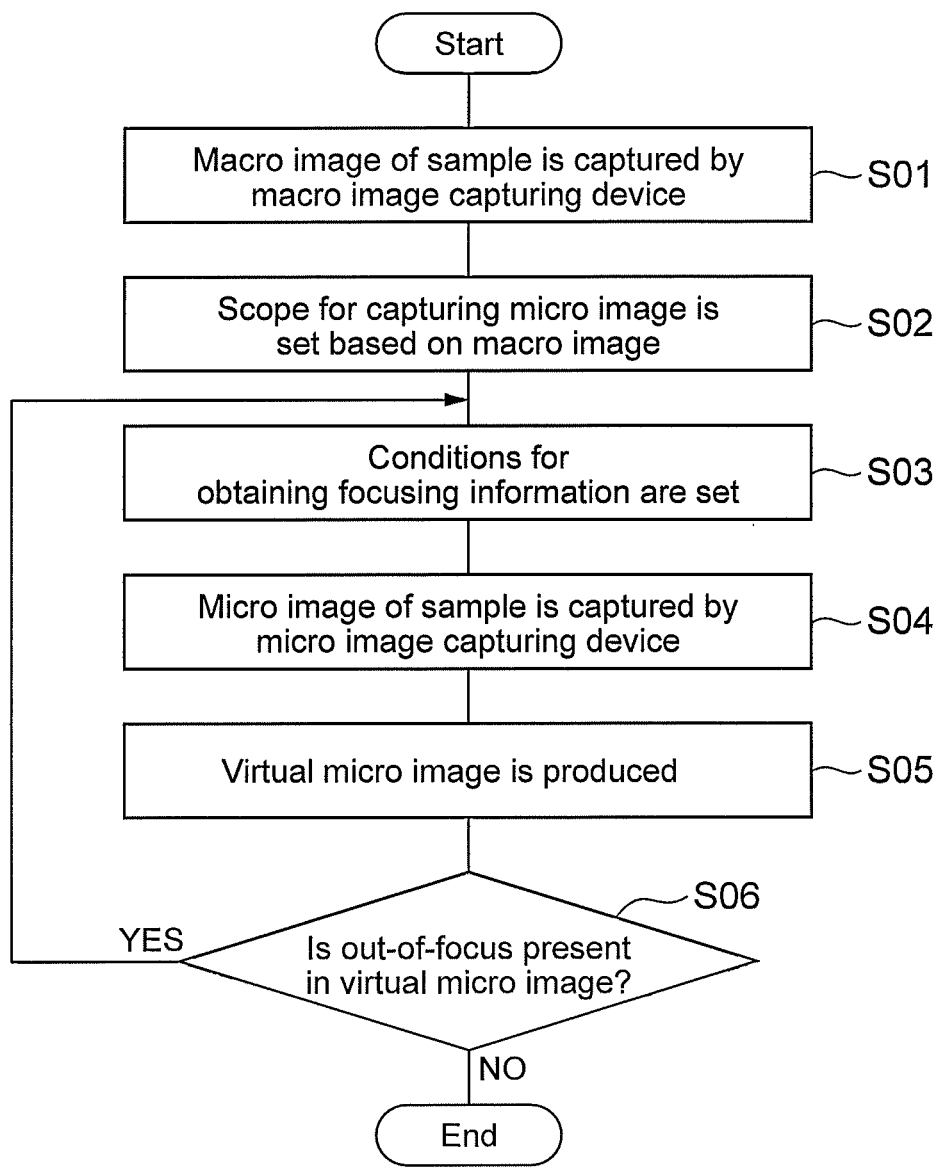
FIG. 11 is a flow chart which shows motions of the image capturing apparatus.

FIG. 11 is a flow chart which shows motions of the image capturing apparatus M. As shown in the flow chart, at the image capturing apparatus M, at first, a macro image of the sample S is captured by the macro image capturing device M1 (Step S01). The thus captured macro image is subjected to binarization by using, for example, a predetermined threshold value and, thereafter, displayed on a monitor 32. A scope for capturing micro images from macro images is set by automatic setting based on a predetermined program or manual setting by an operator (Step S02).

Then, the sample S is transferred to the micro image capturing device M2 and focusing conditions are set (Step S03). Here, as described above, based on a scanning velocity v of the stage 1 and an interval d between the first imaging region 22A and the second imaging region 22B, a waiting time W is set up to the start of image pickup at the second imaging region 22B. It is more preferable that consideration is given to exposure time e 1 of image pickup at the first imaging region 22A, time st from release of setting of the first imaging region 22A to setting of the second imaging region 22B etc.

After setting of the focusing conditions, scanning is started at stage 1 and the micro image capturing device M2 is used to capture a micro image of each of the divided regions 40 of the sample S (Step S04). In capturing the micro image by the first imaging device 18, an extent that the objective lens 15 deviates from the sample S is analyzed at the second imaging device 20 with reference to the first imaging region 22A and the second imaging region 22B based on a difference between the contrast value of the front focus and the contrast value of the rear focus, thereby adjusting a position of the objective lens 15 in real time.

After completion of capturing micro images of all the divided regions 40, the thus captured micro images are synthesized to produce a virtual micro image (Step S05). At this time, for example, the thus produced virtual micro image is displayed on a monitor 32. Whether or not any out-of-focus is present in the virtual micro image is determined according to automatic analysis by using a predetermined program or visual observation by an operator (Step S06).

Where the out-of-focus is determined not to be present in the virtual micro image, the virtual micro image is housed to terminate processing in a state of being associated with a corresponding macro image. On the other hand, where the out-of-focus is determined to be present in the virtual micro image, the processing returns to Step S03 and conditions for obtaining focusing information are set again.

In this case, at first, automatic setting by a predetermined program or manual setting by an operator is employed to extract a region 41 which develops out-of-focus in a synthesized image as shown in FIG. 12(a). Then, as shown in FIG. 12(b), a divided region 40 which contains the region 41 developing the out-of-focus is extracted and a micro image is captured again based on the divided region 40. It is acceptable that the micro image captured here covers the divided region 40 in its entirety which contains the region 41 developing the out-of-focus. It is also acceptable that it covers only the region 41 that develops the out-of-focus for the purpose of shortening scanning time. Further, with consideration given to stability of the stage 1, the captured micro image may cover a region slightly longer than the region 41 that develops the out-of-focus.

Figure 13:
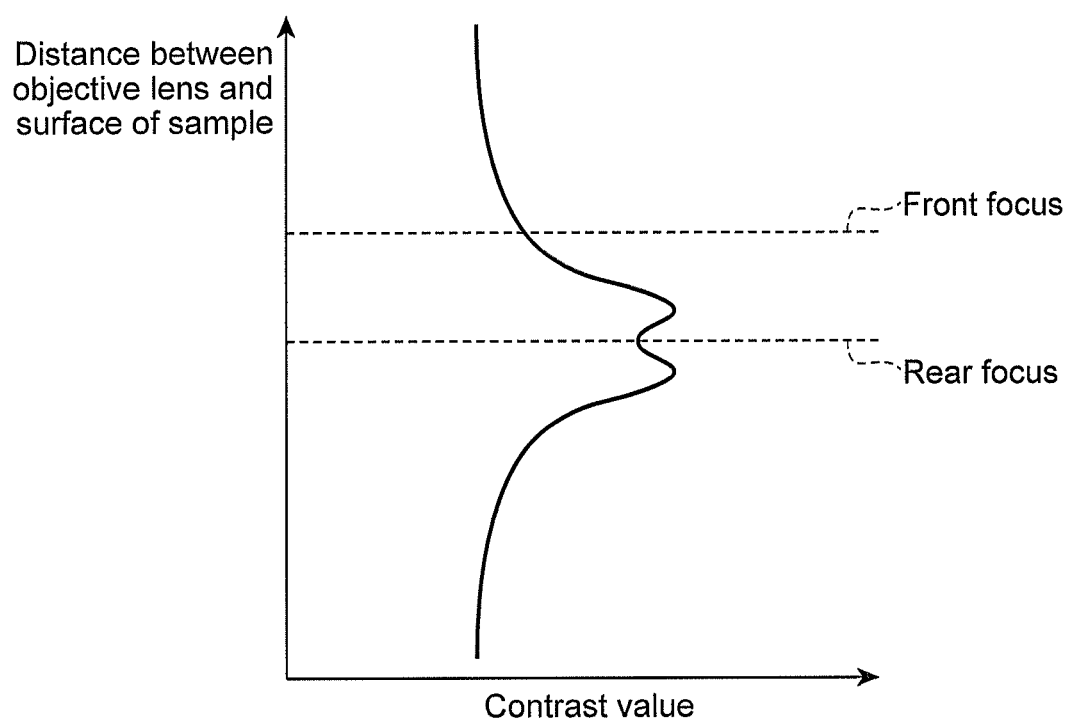
FIG. 13 is a drawing which shows one factor responsible for development of out-of-focus in a synthesized image.
Figure 14:
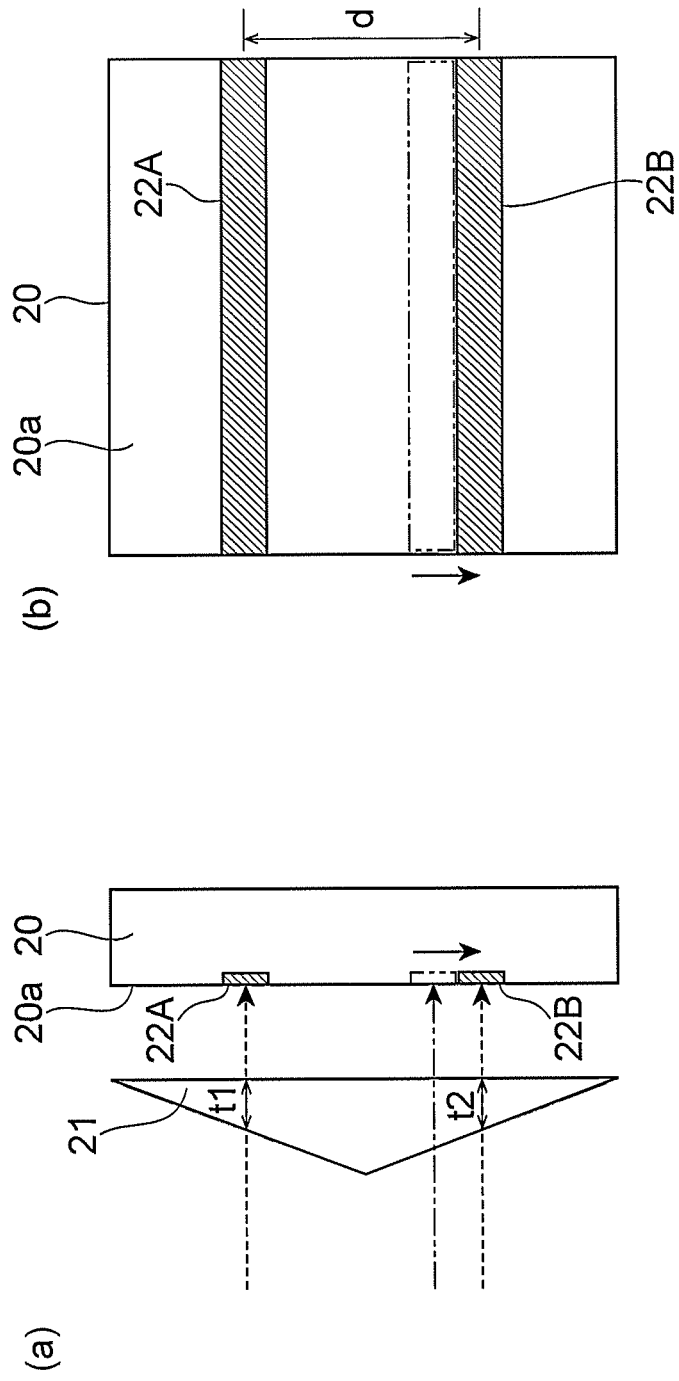
FIG. 14 is a drawing which shows one example in which a position of the first imaging region and a position of the second imaging region are controlled on development of the out-of-focus shown in FIG. 13.

One factor responsible for development of out-of-focus in a synthesized image includes, for example, as shown in FIG. 13, a case where a plurality of contrast value peaks are present in a scope which is narrower than an interval between the front focus and the rear focus. In this case, for example, as shown in FIG. 14, the position of the first imaging region 22A and the position of the second imaging region 22B are changed in such a manner that there is decreased a difference between a thickness t1 of the optical path difference producing member 21 through which the second optical image made incident into the first imaging region 22A passes and a thickness t2 of the optical path difference producing member 21 through which the second optical image made incident into the second imaging region 22B passes.

Figure 15:
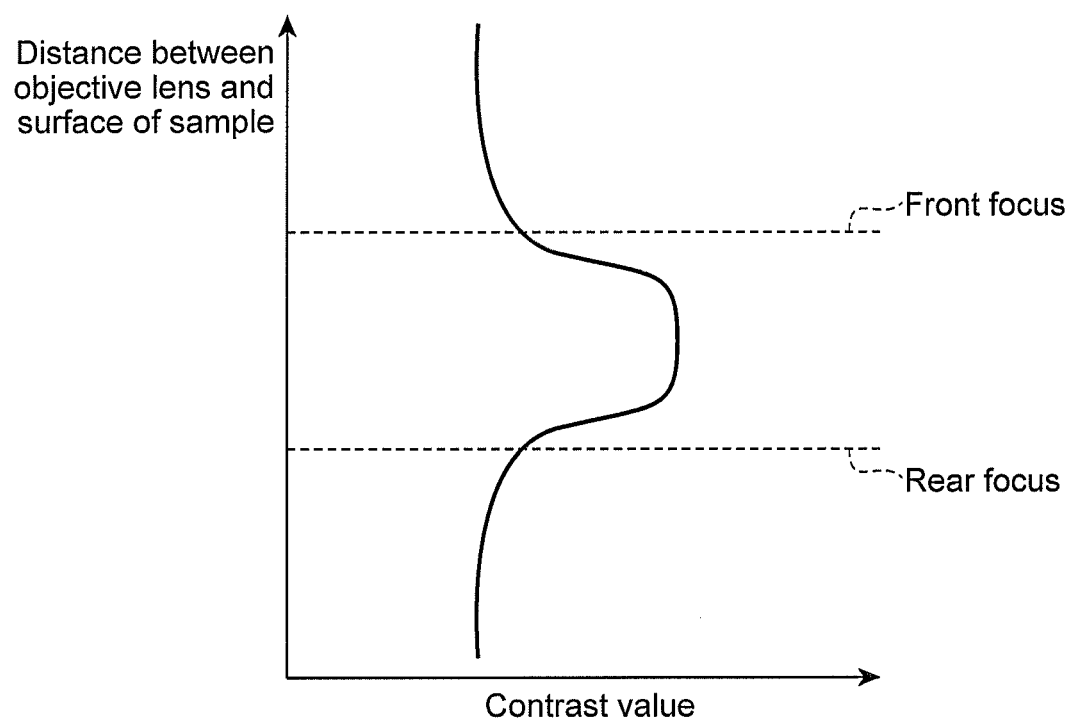
FIG. 15 is a drawing which shows another factor responsible for development of out-of-focus in a synthesized image.
Figure 16:
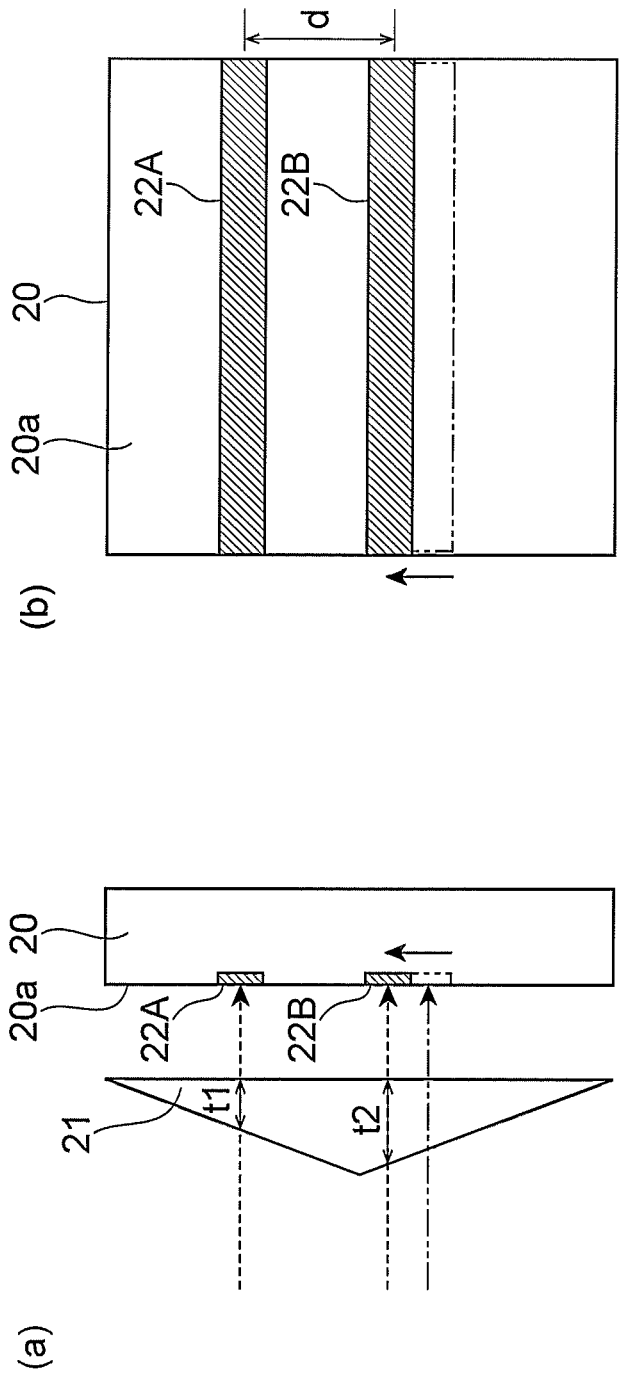
FIG. 16 is a drawing which shows one example in which the position of the first imaging region and the position of the second imaging region are controlled on development of the out-of-focus shown in FIG. 15.

Further, another factor responsible for development of out-of-focus in a synthesized image includes, for example, as shown in FIG. 15, a case where a flat contrast value peak is present in a scope wider than an interval between the front focus and the rear focus. In this case, for example, as shown in FIG. 16, the position of the first imaging region 22A and the position of the second imaging region 22B are changed in such a manner that there is increased a difference between the thickness t1 of the optical path difference producing member 21 through which the second optical image made incident into the first imaging region 22A passes and the thickness t2 of the optical path difference producing member 21 through which the second optical image made incident into the second imaging region 22B passes.

Upon completion of capturing again a micro image, the thus captured micro image is synthesized by being replaced with a part which develops out-of-focus in a micro image which has been captured at the beginning, thereby renewing a virtual micro image. Then, the virtual micro image is housed to terminate processing in a state of being associated with a corresponding macro image.

As described so far, in the image capturing apparatus M, the optical path difference producing member 21 is disposed on the second optical path L2. Thereby, at the first imaging region 22A and the second imaging region 22B of the second imaging device 20, it is possible to image respectively an optical image which is focused at the front of an optical image made incident into the first imaging device 18 (front focus) and an optical image which is focused at the rear thereof (rear focus). In the image capturing apparatus M, since light is not divided on the second optical path L2 for focus control, it is possible to secure sufficiently an amount of light on image pickup by the second imaging device 20. Further, in the image capturing apparatus M, at least one of the position of the first imaging region 22A and the position of the second imaging region 22B on the imaging area 20a is controlled by the region control portion 35, thus making it possible to easily adjust an interval between the front focus and the rear focus. It is also possible to detect a focus position of the sample S at high accuracy.

In the present embodiment, where one of the position of the first imaging region 22A and the position of the second imaging region 22B is changed along the in-plane direction of the imaging area 20a so that the interval d between the first imaging region 22A and the second imaging region 22B will change, it is possible to shorten the time necessary for the change, while a scope of the change between the first imaging region 22A and the second imaging region 22B can be secured.

Further, where both the position of the first imaging region 22A and the position of the second imaging region 22B are changed along the in-plane direction of the imaging area 20a, it is possible to change more widely the interval between the first imaging region 22A and the second imaging region 22B. On the other hand, where both the position of the first imaging region 22A and the position of the second imaging region 22B are changed along the in-plane direction of the imaging area 20a, with the interval d between the first imaging region 22A and the second imaging region 22B being kept, it is possible to shorten the time necessary for the change.

Further, in the image capturing apparatus M, the optical path difference producing member 21 is constituted with a glass member having a part which changes in thickness along the in-plane direction of the imaging area 20a. Thereby, it is possible to make an optical path difference of the second optical image by a simple configuration. In the above-described embodiment, the optical path difference producing member 21 which has a triangle prism-shaped cross section is disposed so that an apex thereof is substantially in alignment with the central part of the imaging area 20a. The optical path difference producing member is applicable to various types of modifications as long as it gives a continuous optical path difference to the second optical image along the in-plane direction of the imaging area 20a.

Figure 17:
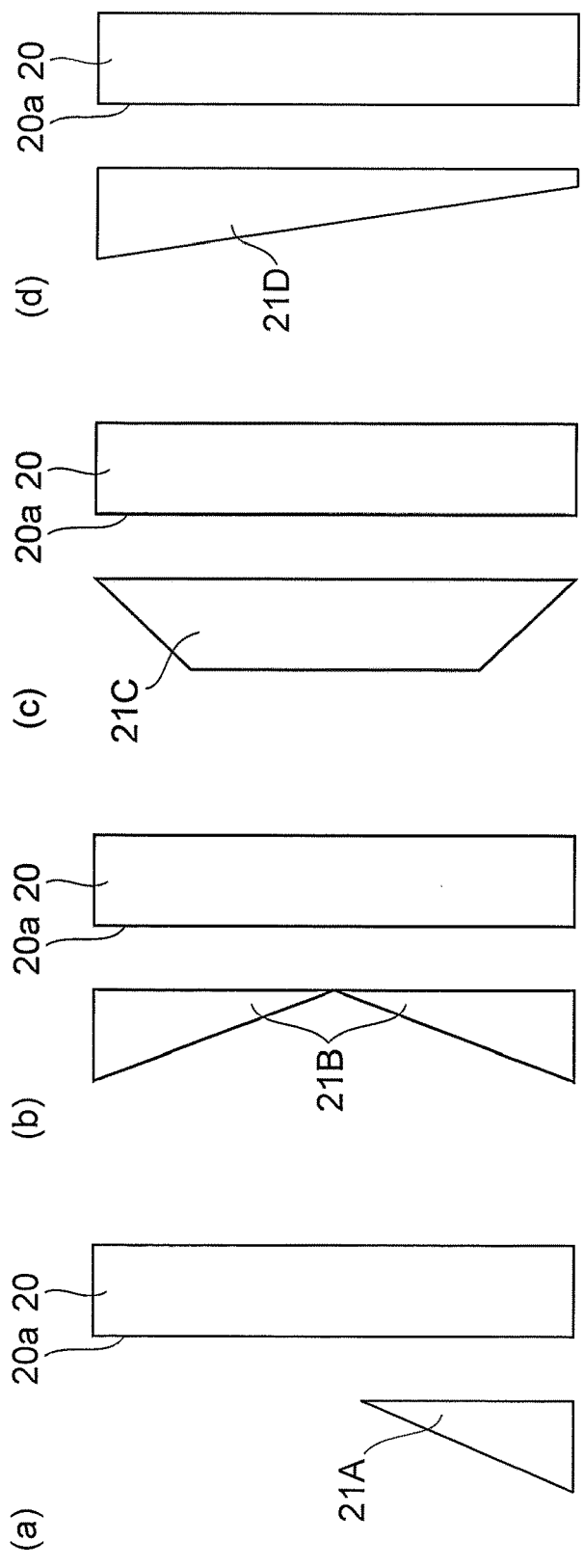
FIG. 17 is a drawing which shows a modified example of the optical path difference producing member.

For example, as shown in FIG. 17(a), it is acceptable that an optical path difference producing member 21A having a right-angle triangle prism-shaped cross section is disposed in such a manner that an inclined face thereof overlaps only on one of half regions of the imaging area 20a in the Z direction. It is also acceptable that, as shown in FIG. 17(b), two optical path difference producing members 21B, each of which has a right-angle triangle prism-shaped cross section, are disposed so as to overlap respectively on one of the half regions and the other of the half regions of the imaging area 20a in the Z direction and also in such a manner that the optical path becomes shorter moving towards the center thereof from ends of the imaging area 20a in the Z direction.

Further, for example, as shown in FIG. 17(c), an optical path difference producing member 21 having an isosceles trapezoid cross section is disposed in such a manner that an inclined face thereof overlaps on one of the end regions and the other of the end regions of the imaging area 20a in the Z direction. It is also acceptable that, as shown in FIG. 17(d), an optical path difference producing member 21 having a trapezoid cross section is disposed in such a manner that an inclined face overlaps on the imaging area 20a in its entirety and also the optical path becomes shorter uniformly moving from one of the ends towards the other of the ends of the imaging area 20a in the Z direction.

In the above-described embodiment, there is exemplified an apparatus for producing a virtual micro image. The image capturing apparatus of the present invention is, however, applicable to various types of apparatuses, as long as the apparatuses are those in which an image is captured by scanning a sample at a predetermined speed by a stage etc.

REFERENCE SIGNS LIST

12 . . . light source, 14 . . . light guiding optical system, 15 . . . objective lens, 16 . . . beam splitter (light dividing unit), 18 . . . first imaging device (first imaging unit), 20 . . . second imaging device (second imaging unit), 20a . . . imaging area, 21, 21A to 21D . . . optical path difference producing member, 22A . . . first imaging region, 22B . . . second imaging region, 34 . . . focus control portion (focus control unit), 35 . . . region control portion (region control unit), 36 . . . objective lens control portion (objective lens control unit), L1 . . . first optical path, L2 . . . second optical path, M . . . image capturing apparatus, M1 . . . macro image capturing device, M2 . . . micro image capturing device, S . . . sample.

The invention claimed is:

1. An apparatus for capturing an image of a sample, the apparatus comprising:
an objective lens that faces the sample;
a beam splitter optically coupled to the objective lens and that divides an optical image of at least a portion of the sample through the objective lens into a first optical image and a second optical image;
a first camera that captures the at least the portion of the first optical image;
a second camera that captures the at least the portion of the second optical image and provide image data;
an optical path difference producing member configured to give a continuous optical path difference to the second optical image along an in-plane direction of an imaging area of the second camera; and
one or more hardware processors having instructions stored in a memory device that when executed cause the apparatus to perform operations comprising:
analyzing the image data to control a focus position of the objective lens based on the analysis result;
controlling at least one of a position of a first imaging region and a position of a second imaging region on the imaging area along the in-plane direction; and
changing both the position of the first imaging region and the position of the second imaging region along the in-plane direction so that an interval between the first imaging region and the second imaging region changes;
wherein the first imaging region and the second imaging region are set upon the imaging area of the second camera to capture the at least the portion of the second optical image on the imaging area, the first imaging region being captured before the second imaging region.

2. The apparatus of claim 1, wherein
the optical path difference producing member is a glass member having a part which changes in thickness along the in-plane direction of the imaging area.

3. The apparatus of claim 1, the operations further comprising:
changing one of the position of the first imaging region and the position of the second imaging region along the in-plane direction so that an interval between the first imaging region and the second imaging region changes.

4. The apparatus of claim 1, the operations further comprising:
changing both the position of the first imaging region and the position of the second imaging region along the in-plane direction, without changing the interval between the first imaging region and the second imaging region.

5. The apparatus of claim 1, the operations further comprising:
controlling a position of the objective lens relatively with respect to the sample based on the analysis result, wherein the objective lens is not actuated during analysis of the focus position.

6. A method of capturing an image of a sample, the method comprising:
by an objective lens, acquiring an optical image of at least a portion of a sample supported on a stage;
dividing the optical image into a first optical image and a second optical image
giving a continuous optical path difference to the second optical image;
capturing at least a portion of the first optical image;
setting a first imaging region and a second imaging region to capture the at least the portion of the second optical image, the second imaging region being captured after a predetermined time from capture of the first imaging region;
controlling at least one of a position of the first imaging region and a position of the second imaging region;
changing both the position of the first imaging region and the position of the second imaging region so that an interval between the first imaging region and the second imaging region changes;
by the first imaging region and the second imaging region, capturing the at least the portion of the second optical image and providing image data; and
analyzing the image data to control a focus position of the objective lens based on the analysis result in an analysis period.

7. The method of claim 6, further comprising:
providing the continuous optical path difference to the second optical image.

8. The method of claim 6, further comprising:
changing the at least one of the position of the first imaging region and the position of the second imaging region to change an interval between the first imaging region and the second imaging region.

9. The method of claim 6, further comprising
changing both the position of the first imaging region and the position of the second imaging region and keeping with an interval between the first imaging region and the second imaging region.

10. The method of claim 6, further comprising:
keeping the position of the objective lens relatively with respect to the sample in the analysis period, and
controlling the position of the objective lens relatively with respect to the sample based on the analysis result.

11. A method of capturing an image of a sample, the method comprising:
by an objective lens, acquiring an optical image of at least a portion of the sample supported on a stage;
dividing the optical image into a first optical image and a second optical image;
giving a continuous optical path difference to the second optical image;
capturing at least a portion of the first optical image;
capturing at least a portion of the second optical image and providing image data, the at least the portion of the second optical image being captured a predetermined time from the at least the portion of the second optical image;
controlling at least one of a position of the first imaging region and a position of the second imaging region;
changing both the position of the first imaging region and the position of the second imaging region so that an interval between the first imaging region and the second imaging region changes;
analyzing the image data to control a focus position of the objective lens based on the analysis result in an analysis period; and
keeping a position of the objective lens relatively with respect to the sample in the analysis period.

12. An apparatus for capturing an image of a sample, comprising:
an objective lens that faces a sample;
a beam splitter optically coupled to the objective lens and that divides an optical image of at least a portion of the sample through the objective lens into a first optical image and a second optical image;
a first camera that captures at least a portion of the first optical image;
a second camera that captures at least a portion of the second optical image given a continuous optical path difference and provides image data, the at least the portion of the second optical image being captured a predetermined time from the at least the portion of the second optical image; and
one or more hardware processors having instructions stored in a memory device that when executed cause the apparatus to perform operations comprising:
analyzing the image data to control a focus position of the objective lens based on the analysis result in an analysis period;
controlling a position of the objective lens relatively with respect to the sample, wherein the position of the objective lens is not actuated during the analysis period;
controlling at least one of a position of a first imaging region and a position of a second imaging region on the imaging area along an in-plane direction; and
changing both the position of the first imaging region and the position of the second imaging region along the in-plane direction so that an interval between the first imaging region and the second imaging region changes.

* * * * *